O. T. BUGG.
SHOCK ABSORBER.
APPLICATION FILED AUG. 7, 1913.
1,108,488. Patented Aug. 25, 1914.
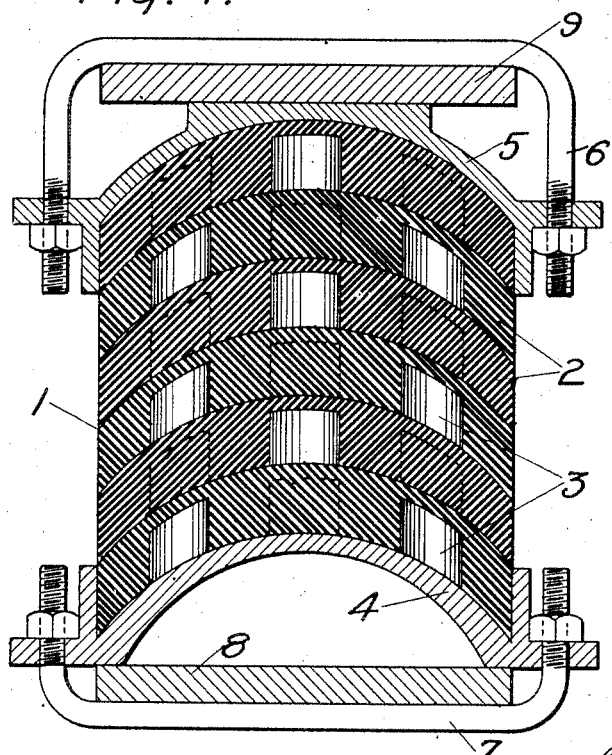
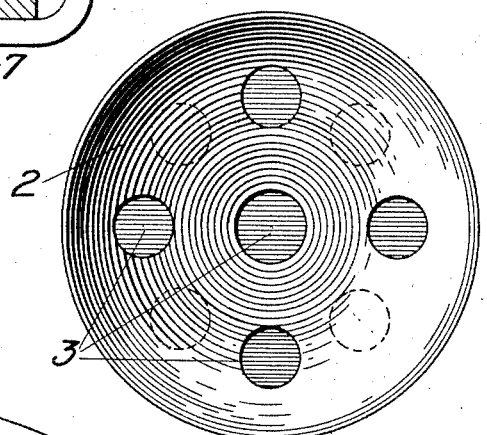
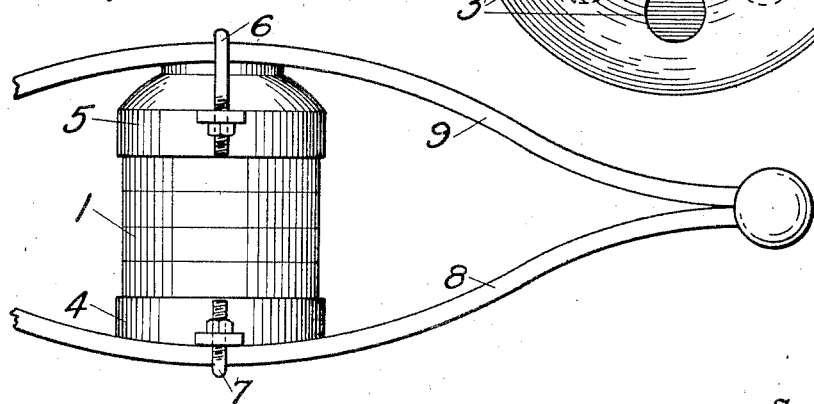

UNITED STATES PATENT OFFICE.

OWEN T. BUGG, OF HOBOKEN, NEW JERSEY, ASSIGNOR TO E-Z- RYDE SHOCK ABSORBER CO., OF NEW YORK, N. Y.

SHOCK-ABSORBER.

1,108,488.  Specification of Letters Patent.  Patented Aug. 25, 1914.

Application filed August 7, 1913. Serial No. 783,474.

*To all whom it may concern:*

Be it known that I, OWEN T. BUGG, a citizen of the United States, and resident of Hoboken, county of Hudson, and State of New Jersey, have made a new and useful Invention in Shock-Absorbers, of which the following is a specification.

My invention is directed particularly to shock absorbers for wheeled vehicles, such as carriages, wagons, automobiles, motor trucks, and the like, and it has for its objects, First, to produce a shock absorber which will be simple, cheap and efficient. Second, to produce a shock absorber which may be quickly attached to and detached from the vehicle. Third, to produce a shock absorber in which air at atmospheric pressure is utilized in hermetically sealed cells located at different heights and formed in any elastic medium.

For a full and clear understanding of the invention such as will enable others skilled in the art to construct and use the same, reference is had to the accompanying drawings, in which, Figure 1 is a sectional view of my improved shock absorber and the means for attaching the same to the springs of a carriage. Fig. 2 is a plan view of the same with the means for attaching it to the springs of the carriage removed; and Fig. 3 is a front elevational view of the same upon a smaller scale, showing it as applied to the spring of a carriage.

Referring now to the drawings in detail, 8 and 9 represent the springs of a vehicle secured together at their ends in the usual manner and sustaining my improved shock absorber at the center thereof in which 1 and 2 are a series of cup-shaped disks of soft rubber or other highly elastic material. In constructing these disks they are formed preferably in a mold and at the same time a number of cells 3 are molded therein, which cells are open at their bottoms. These disks are then vulcanized to the desired degree, preferably so as to make the elasticity as great as possible or as near the same as that of atmospheric air, for a purpose to be hereinafter described. The disks are then coated on both sides with a covering of any preferred cement which will tightly and hermetically seal them together, being careful to locate the respective disks one above the other and in such manner that all the cells of one disk in each series, except the central one, are staggered with relation to all of the others, so as to form the strongest possible construction, as clearly shown in Fig. 1. The entire structure is then subjected to heat and pressure, if necessary, such as will effectually unite the parts together and virtually make one integral mass, the tops of each disk or cup effectually sealing the cells of the cup above it.

4 and 5 are strong convex and concave supporting devices made preferably of steel and having horizontal flanges in which are located diametrical holes for receiving bolts 6 and 7 so as to secure the devices to the springs 8 and 9, the upper disk having an extension for affording secure connection with the spring 9 and the lower disk resting at its opposite sides on the spring 8. These parts are assembled in the manner shown with the elastic shock absorber firmly held in position by the vertical circular flanges, as shown.

I do not limit myself to the specific invention disclosed in the drawings and hereinbefore described, as I believe it is broadly new with me to provide a shock absorber which combines the elastic effect of air at atmospheric pressure, when hermetically sealed in two or more series of cells of soft rubber or other yielding material, so that the joint elastic effect of the several series of cells, located at different heights, and the rubber or other yielding material will give the best results. I have discovered that such a shock absorber possesses the highest possible elasticity and reduces the shocks offered by a vehicle much more than is possible with soft rubber or other elastic material alone, which I am aware has heretofore been used largely in the arts for the purpose of preventing shocks or blows due to the weight carried by the springs of vehicles.

I also desire it to be understood that my invention is capable of wide use in the arts for the purpose named and I do not limit myself to any specific use or appliance.

I may make this shock absorber of raw rubber by locating cells of vulcanized rubber throughout the mass thereof and then vulcanize the whole.

Having thus described my invention what I claim and desire to secure by Letters Patent of the United States is—

1. A shock absorber embracing atmospheric air inclosed in a plurality of hermetically sealed cells and located at different heights in yielding containing means having substantially the same elasticity as the air.

2. A shock absorber composed of a yielding material and having throughout its body cells filled with air at substantially atmospheric pressure, said cells being hermetically sealed and located at different heights.

3. A shock absorber constructed of a plurality of disks of soft elastic material, each disk being provided with a plurality of cells hermetically sealed and containing air at atmospheric pressure.

4. A shock absorber embracing a mass of elastic material, as rubber, having located throughout its volume a plurality of cells filled with air at substantially atmospheric pressure said cells being hermetically sealed and located at different heights, the elasticity of the material being substantially the same as that of the air.

5. A shock absorber composed of a mass of elastic material having a plurality of cells located at different heights throughout the mass and hermetically sealed, said cells containing air at substantially atmospheric pressure, the elasticity of the mass being substantially that of the air.

6. A shock absorber composed of a plurality of cup-shaped disks having a plurality of cells located in the lower portions of said disks, which disks are hermetically sealed and held together by a sealing cement.

7. A shock absorber embracing a plurality of cup-shaped disks having each a plurality of cells in its lower surface and all hermetically sealed together by a sealing cement, said cells being staggered with relation to each other in the various disks.

8. A shock absorber embracing a plurality of cup-shaped rubber disks each having cells in its lower surface and all held together by cement so as to constitute one integral mass; together with means for securing the same to the springs of a vehicle.

In testimony whereof I have signed my name to this specification in the presence of two subscribing witnesses.

OWEN T. BUGG.

Witnesses:
C. J. KINTNER,
M. F. KEATING.